May 13, 1930.    L. G. DAVIES    1,758,433
CAPSULING APPARATUS
Filed March 29, 1928    2 Sheets-Sheet 1
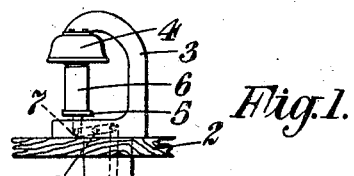
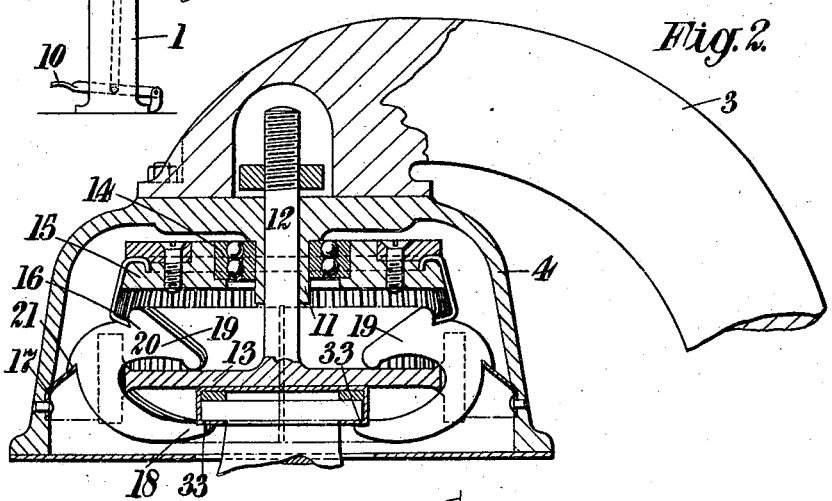
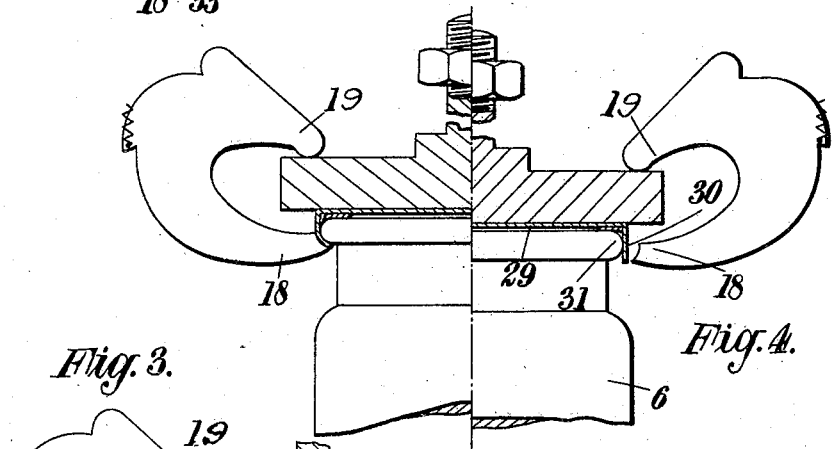
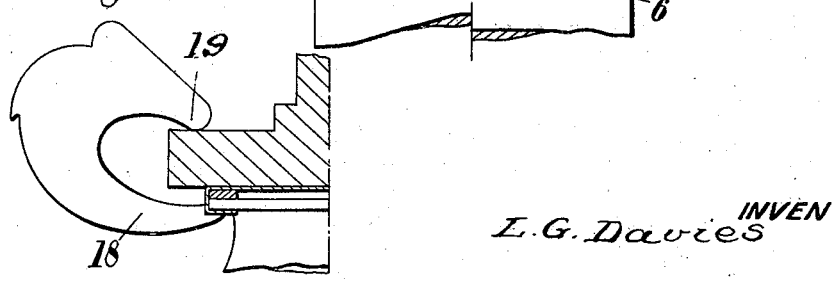
INVENTOR
L. G. Davies
BY
ATTORNEY May 13, 1930.   L. G. DAVIES   1,758,433
CAPSULING APPARATUS
Filed March 29, 1928   2 Sheets-Sheet 2

INVENTOR
L. G. Davies
BY
ATTORNEY

Patented May 13, 1930

1,758,433

UNITED STATES PATENT OFFICE

LEONARD GORDON DAVIES, OF WELDSTONE, ENGLAND

CAPSULING APPARATUS

Application filed March 29, 1928, Serial No. 265,768, and in Great Britain April 6, 1927.

This invention relates to capsule sealing devices for bottles, jars, and like containers.

The invention comprises broadly a capsuling device in which the capsule is adapted to be automatically closed on the mouth of a container by a single relative movement between the container and the closing device.

The device preferably comprises a plurality of capsule closing fingers and an upwardly movable abutment plate, the fingers being adapted to close a capsule round the mouth of a container when the latter is caused to lift the abutment plate.

In the preferred form there is provided an annularly arranged series of combined rocking pawls and closing fingers each combined member being separately suspended by resilient means, the fingers being automatically caused to close the capsule when the capsule is lifted against the pawls.

It is a further object of the invention to provide a capsuling apparatus having a plurality of separately mounted and actuated capsule closing fingers.

It is a further object of the invention to provide a combined operating pawl and capsule closing finger integrally formed in a C-shaped member.

It is a further object of the invention to provide a capsuling apparatus in which movement of the container requiring to be capsuled operates the capsule closing fingers.

It is a further object of the invention to provide a capsule closing apparatus in which the capsule closing fingers are mounted to rock about resilient fulcrums.

These and other objects will be made clear in the following description and set out in the appended claims.

The invention is illustrated in the accompanying drawing in which

Fig. 1 represents an elevation of a capsuling device,

Fig. 2 is an elevation partly in section of the operative parts of the closing mechanism to a larger scale than Fig. 1.

Fig. 3 is an enlarged view of part of Fig. 2 showing a closing finger in the closing position.

Fig. 4 illustrates in the open and closed positions a modified form of capsule closing finger.

Figure 6:
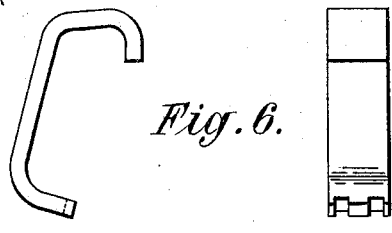
Fig. 6 shows in three separate views a side elevation, a front elevation, and a plan of one of the spring fingers.

Referring now to the drawings the complete device here illustrated comprises a body 1 passing through a bench or table 2 and provided with a head 3 comprising a capsuling mechanism positioned within a casing 4 and a supporting plate 5 for a jar or other container 6 requiring to be capsuled. The supporting plate 5 is slidably mounted by means of a vertically-sliding spindle 7 and is adapted to be raised through the intermediary of links 8 and 9 from a pedal 10. The casing 4 is detachably secured to the head 3 and has a downwardly-extending boss 11 slidably housing a rod 12 supporting an abutment plate 13. Exteriorly mounted on the boss 11 is a double ball race 14 supporting a plate 15 to which are detachably mounted a series of spring fingers 16 shaped generally as shown in Fig. 6. In the form shown, the spring fingers are notched at their operative ends to receive the shoulders of two pawls, but a spring may be provided for each pawl and if desired all the springs may be formed integrally together and may be cut and shaped from an annular ring or collar of spring metal. Interiorly of the casing 4 are mounted a second series of spring fingers 17 which in the form shown may be constructed from a single collar of spring metal.

Figure 5:
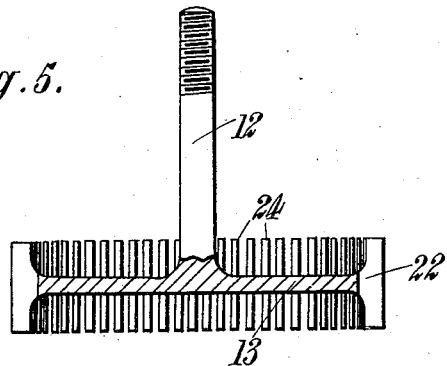
Fig. 5 is a view in elevation, partly in section, of the abutment plate.

The actual capsule closing devices in the form shown comprise C-shaped members of spring steel, each of which include capsule closing fingers 18 and operating pawls 19. The members are formed with notches 20 to be engaged by the ends of the spring fingers 16, and with teeth 21 behind which the ends of the spring fingers 17 are adapted to be engaged. A number of these combined members are arranged annularly round the edge of the plate 13, the number varying according to the nature and size of the container intended to be capsuled. The number may, for example, be as low as 36 or as high as 72 or 112 or larger. Each combined pawl and finger is suspended by the tips of the springs 16, 17 and the edge of the plate 13, that is to say, the combined members are not constrainedly articulated about fixed pivots or the like, but are free to exercise within limits both movement of rotation and movements of translation in two dimensions at right angles to each other. The combined members are, however, spaced from each other to prevent movement of translation at right angles to their faces, partly by the ends of the springs 16 and partly by spacing members formed from a vertical flange 22, Fig. 5, formed round the edge of the plate 13 and provided with saw cuts so as to leave a series of vertical spacing plates 24 arranged annularly round the edge of the plate 13.

It will be understood that in the complete apparatus a combined closing member is situated in each saw cut of the flange 22, adjacent members being spaced and positioned by the plates 24.

In use, a jar or container 6 with a capsule seated on its mouth is placed on the platform 5 on which suitable centering stops are preferably provided. The capsule in these circumstances is positioned within and between the tips of all the fingers 18 in the annularly arranged series, and the capsule top 29 is then in close juxtaposition or actual contact with the underside of plate 13. The platform 5 is then raised by pedal 10 whereupon the plate 13 is raised by the top of the bottle and lifts the pawls 19 causing them to rock generally about the tips of fingers 16. The closing fingers 18 thereupon are forced inwardly and upwardly against the depending flange 30 of the capsule 29 and effectually close it below the underside of the bead 31 of the container 6.

It will be appreciated that in the above operation it is necessary that the lift of the fingers 18 shall be more than the lift of the pawls 19 and that in general the obliquity and length of the line between the notch 20 and the contact surface of the fingers 18, and the obliquity and length of the line between the pawls 19 and notch 20 have to be chosen generally with regard to the shape and size of the bead 31 of bottle 6.

It is, however, an important feature of the present invention that the apparatus employed is capable of use with containers varying considerably between usefully wide ranges and further that the apparatus is not liable to be deranged, nor to damage the bottle or container should the rim or bead be irregularly formed either in height, width or circularity.

It is with these requirements in view that the pawls are separately suspended in the manner disclosed so as to be capable of two movements of translation as well as a movement of rotation, and it is further with the said requirements in view that the whole of the closing apparatus, namely the pawls, fingers, and centering springs 16 are mounted by means of the double ball race 14 so that the whole assembly mounted on the plate 15 is capable of a rocking movement.

In the form illustrated further flexibility is afforded through the combined pawls and fingers 18 and 19 being formed of spring metal, the jaw of this combined member being able to open slightly in the case of unexpected resistance.

In the form illustrated in Figs. 2 and 3, the tips of the fingers are intended to engage with a rim 31 whose underside is squared, that is to say, it projects more or less horizontally from the neck of the jar. For this purpose the fingers are shaped with more or less horizontally-arranged closing surfaces 33 and it will be readily appreciated that as the closing fingers move upwardly they also move inwardly and exercise a rubbing and smoothing movement on the skirt 30 of the capsule 29, effectively smoothing it down and closing it with a firm and a strong pressure to produce an effective seal.

The modification shown in Fig. 4 illustrates closing fingers adapted to cooperate with rounded beads 31 but the operation of the device is similar to that already described and the opening and closing positions of the fingers are clearly shown on the right and left hand sides of the figure respectively. The springs 16 as already stated serve generally to provide a centre of rotation for the movement of the pawls and fingers, the spring 17 being weaker than the spring 16 and serving to open the pawls after the closing movement and to maintain them in their position when not under actuation. The springs 16 however move outwardly to varying extents during the lift of the container and provide the principal degree of flexibility whereby the whole series of closing fingers is adapted to accommodate itself to irregularities or variations in the shapes of the beads 31.

In the above modifications it will be appreciated that the lift of the container raises the plate 13 which returns again after operation under gravity, the plate 13 serving first as an abutment plate between the top of the container and the pawls 19, and also as a positioning plate to hold the combined pawls and fingers against the springs 16, 17.

Figure 7:
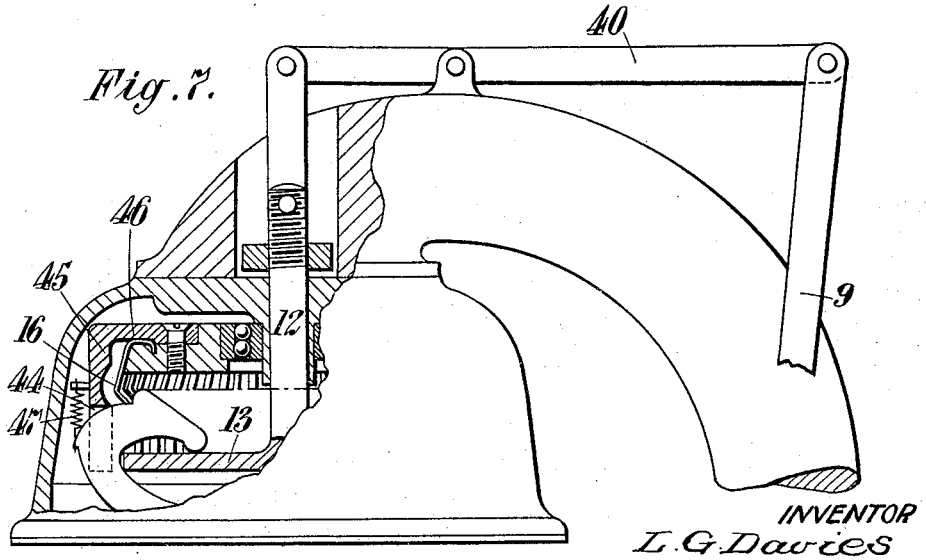
Fig. 7 is a modification of Fig. 2.

In the modification illustrated in Fig. 7, however, the plate 13 is arranged to be positively lifted by the rod 12 which for this purpose is coupled to a pivoted link 40 arranged above the device and operated as before from the pedal 10 through a tie 9. In this modification also the plate 13 is not provided with spacing plates 24 the pawls being spaced by plates 44 formed by making saw cuts in a downwardly-extending skirt 45 of the annular plate 46 which holds the springs 16 in position. The return spring for the closing fingers in this modification comprises a coiled spring 47 secured to a pin mounted in the skirt 45. The jar or container in this modification is carried on a platform 5 which is resiliently urged upwardly by means of a conventional spring or otherwise so as to remain in contact with the underside of plate 13 during its lift.

The process of closing the capsule round the rim of the container is generally similar to that of the previous modification.

In either case the container can be fed in by hand and held up by hand until the fingers begin to grip the bead.

I claim:—

1. A capsuling apparatus including a plurality of capsule closing fingers, and a resilient fulcrum for each of said fingers, said fulcrum permitting movement of the finger in both vertical and horizontal directions.

2. A capsuling apparatus including a plurality of capsule closing fingers, an operating pawl for each of said fingers, and a fulcrum for each pawl, said fulcrum being wholly resilient and taking the reaction of the fingers in their movement in vertical and horizontal directions.

3. A capsuling apparatus including a plurality of capsule closing fingers, and a spring fulcrum for each of said fingers, said fulcrum yielding in downward and outward direction under automatically increasing resistance incident to the fulcrum per se.

4. A capsuling apparatus including a plurality of combined operating pawls and fingers, a resilient fulcrum for each of the pawls, and means for simultaneously operating the pawls with respect to the fingers, the fulcrum being adapted to yield in downward and outward directions in case of excessive resistance to the inward and upward movement of the terminals of the fingers.

5. In a capsuling machine, a plurality of capsule closing fingers, a plurality of finger operating pawls, spring fulcruming means for said fingers and pawls, and means for operating the pawls to compel a relative inward and upward movement of the terminals of the fingers, the fulcrums being adapted to yield in downward and outward directions in case of excessive resistance to the inward and upward movement of the terminals of the fingers.

6. A capsuling apparatus having an annular series of capsule closing fingers, an annular series of operating pawls, means to position the container having its mouth covered by a capsule below said series of pawls and within said series of fingers, resilient fulcrums to position and support said fingers, means to cause the pawls to rock the fingers inwardly and upwardly into engagement with the capsule, the fulcrums being adapted to yield in downward and outward directions in case of excessive resistance to the inward and upward movement of the terminals of the fingers.

7. A capsuling apparatus including a movable abutment plate, a member relative to which said plate is movable, a plurality of spring fulcrum elements attached to said member, a plurality of capsule closing fingers and pawls combined supported by and rockable about said resilient fulcrum elements, and means cooperating with the pawls to move the terminals of the fingers inwardly and upwardly, the fulcrums being adapted to yield in downward and outward directions in case of excessive resistance to the inward and upward movement of the terminals of the fingers.

8. A capsuling apparatus including a movable abutment plate, a member relative to which said plate is movable, a plurality of spring fulcrum elements attached to said member, a plurality of capsule closing fingers and pawls combined supported by and rockable about said resilient fulcrum elements, means co-operating with the pawls to move the terminals of the fingers inwardly and upwardly, and means on the abutment plate for maintaining the combined fingers and pawls in spaced relation, the fulcrums being adapted to yield in downward and outward directions in case of excessive resistance to the inward and upward movement of the terminals of the fingers.

9. A capsuling apparatus including a movable abutment plate, a member relative to which said plate is movable, a plurality of spring fulcrum elements attached to said member, a plurality of capsule closing fingers and pawls combined supported by and rockable about said resilient fulcrum elements, means cooperating with the pawls and to move the terminals of the fingers inwardly and upwardly, and means on the abutment plate whereby the pawls are prevented from relative movement toward each other, the fulcrums being adapted to yield in downward and outward directions in case of excessive resistance to the inward and upward movement of the terminals of the fingers.

In testimony whereof I affix my signature.

LEONARD GORDON DAVIES.